Figure 1:
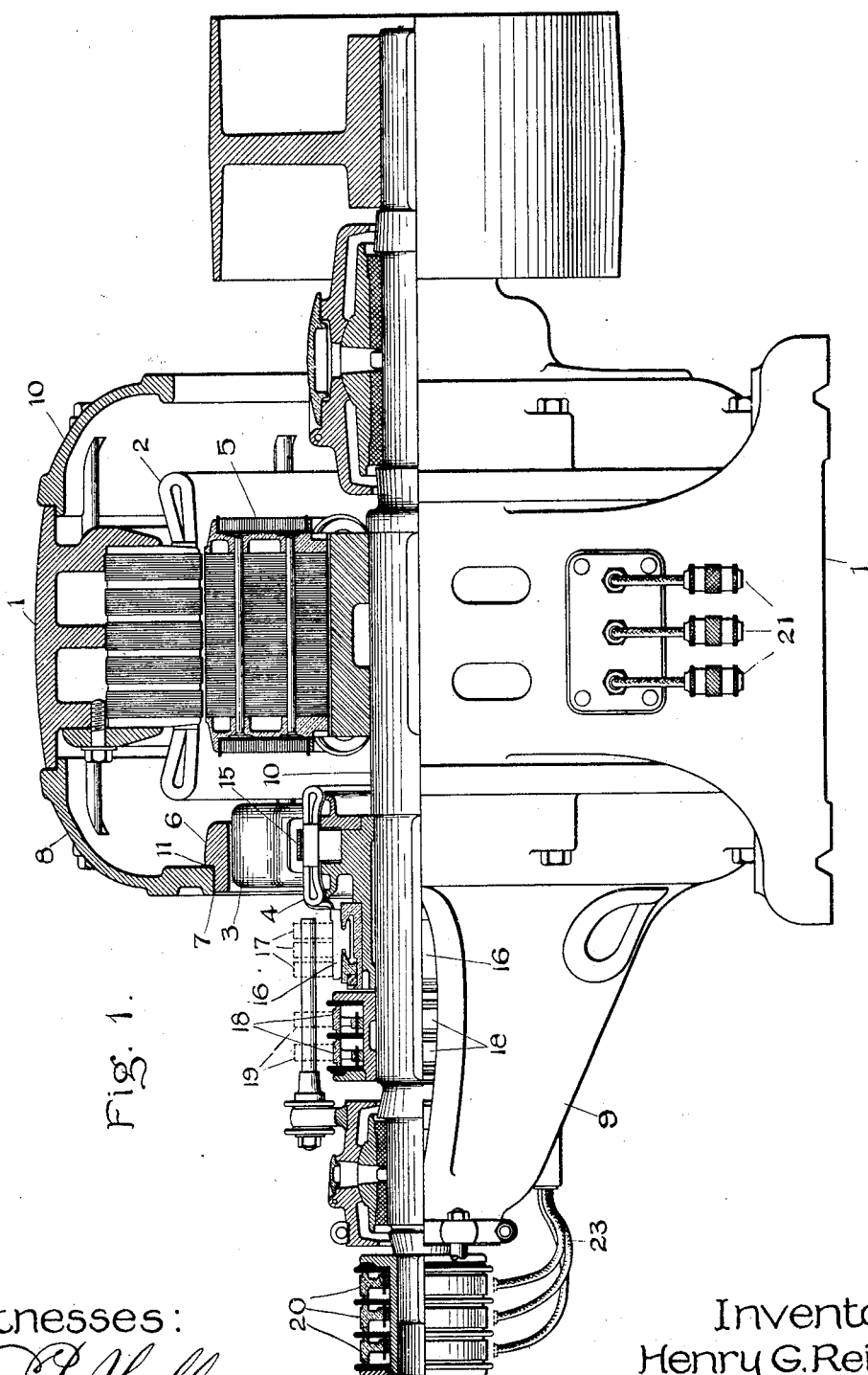

No. 706,108. Patented Aug. 5, 1902.
H. G. REIST.
DYNAMO ELECTRIC MACHINE.
(Application filed Nov. 13, 1900.)
(No Model.) 2 Sheets—Sheet 2.

Witnesses:
Lewis F. Abell
Benjamin B. Hull

Inventor.
Henry G. Reist,
by Albert G. Davis,
Atty.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK

DYNAMO-ELECTRIC MACHINE.

SPECIFICATION forming part of Letters Patent No. 706,108, dated August 5, 1902.

Application filed November 13, 1900. Serial No. 36,368. (No model.)

*To all whom it may concern:*

Be it known that I, HENRY G. REIST, a citizen of the United States, residing at Schenectady, county of Schenectady, State of New York, have invented certain new and useful Improvements in Dynamo-Electric Machines, (Case No. 1,278,) of which the following is a specification.

My present invention comprises certain improvements embodied in an alternating-current dynamo-electric machine now well known in the art as a "compensated alternator." The principles of operation of a machine of this type are set forth at length in a patent granted on an application of E. W. Rice, Jr., No. 595,412, December 14, 1897, the claims of which patent broadly cover the type of machine mentioned. Such a machine, as will be evident from an inspection of the patent mentioned, comprises as its principal feature an alternating-current generator the field of which is supplied with direct current from a synchronously-driven exciter. The voltage of the exciter is automatically controlled by passing current derived from the main alternator through the armature of the exciter, thereby varying the armature reaction of the exciter, which in turn varies the field strength and regulates the voltage. The alternating current is fed to the exciter in such a manner as to produce in the armature-winding a rotating magnetic field moving with respect to the armature in a direction opposite from the direction of rotation of the armature. As the exciter-armature moves forward with the same speed with which the rotary field therein moves backward, the field as a consequence remains stationary in space as long as the power factor of the load remains constant. To secure the necessary initial adjustments of this field with respect to the field-magnets upon which in practical operation it reacts, I have devised a structure in which the field-magnets of the exciter are mounted so that they may be angularly displaced, thereby adjusting the angle at which the armature-flux is permitted to act upon the field.

Another feature of my invention consists in bridging over the field-poles of the exciter by a band of magnetic material, which by reason of saturation does not allow an undue short-circuiting of the field-flux. I find that the presence of this bridge makes the compounding more regular.

My invention comprises other features of novelty and possesses various advantages, all of which will be pointed out in the following description, which is to be taken in connection with the accompanying drawings.

The points of novelty of my invention are particularly set forth in claims appended hereto.

Figure 2:
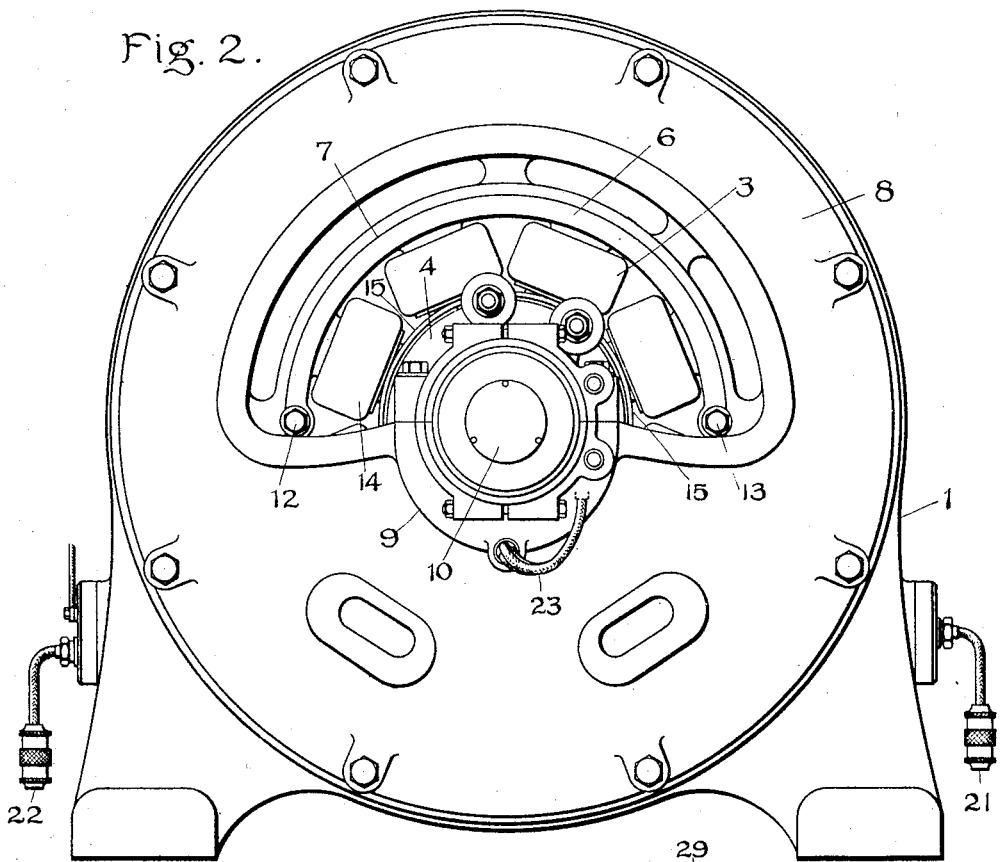
Figure 3:
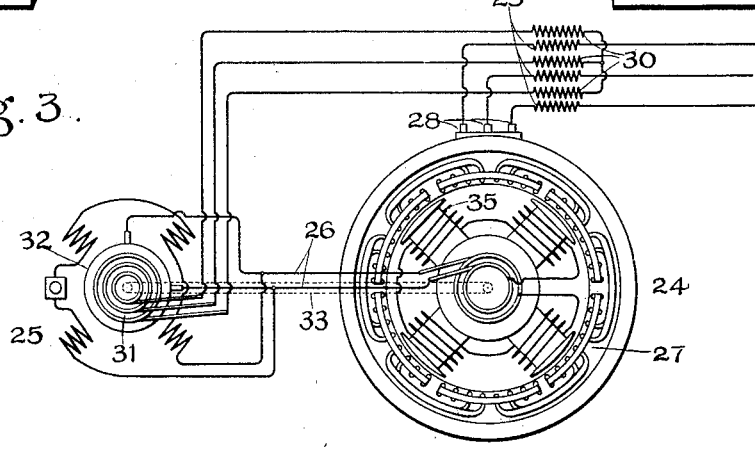

In the drawings, Figure 1 represents a side elevation, partly in section, of a machine embodying my invention. Fig. 2 is an end view of the same, while Fig. 3 is a diagram useful in explaining the connections and mode of operation of the machine.

Referring first to the structure of the machine as indicated in Fig. 1, it will be seen to consist in its main features of a solidly-built supporting-frame 1, carrying the induced member 2 of an internal revolving-field alternator and the field-magnet structure 3 of a direct-current exciter, the armature 4 of which is mounted upon the same shaft as the revolving-field structure 5 of the main alternator. No detailed description of the structure of this alternator is necessary, since the same may be of any usual and suitable character. I prefer, however, to employ a type of alternator in which the field revolves, since thereby I obtain certain mechanical and electrical advantages not necessary to describe herein.

The yoke or frame 6, carrying the field-magnet poles and field-spools of the exciter, is provided with an annular bearing 7, formed upon the inwardly-extending curved flange 8, constituting one of the side pieces of the main frame 1 of the machine. This circular flange 8 or side portion of the frame is extended outward at 9, so as to form a support for the bearings for one end of the main shaft 10, the other end of which is similarly supported in bearings carried in like manner by another rounded flange or side portion 10, attached to the main frame 1.

Returning to the description of the yoke 6, it will be seen that the same is provided with a recessed bearing-surface 7, extending along the outer surface of the ring and terminating in an angular ledge 11 at right angles to the surface 7. When the yoke 6 is in place in its bearing in the side piece 8, this ledge abuts against the side portion of the side piece 8 and permits the yoke and the parts supported thereby to be firmly secured in place by clamping-bolts 12 and 13, the heads of which are indicated in Fig. 2. By loosening these bolts the exciter-field may be slid backward or forward in its bearings, and when a desired position of the same is reached it may be clamped securely in position, as will be evident.

The field-poles of the exciter are all connected together mechanically by a thin ring 15, of magnetic material, preferably cast-iron, extending across and between all of the pole-faces. The object of this ring, as has already been explained, is to improve the automatic regulating action of the machine, and this it does by rendering the regulating effect less abrupt during one portion of the range of regulation. At the same time the ring serves as a mechanical support for the field-coils.

The armature of the exciter is shown at 4 and is provided with an ordinary winding of the direct-current type connected in the usual manner to a commutator 16, upon which bear brushes, which for convenience in illustration are shown conventionally in dotted lines at 17.

Mounted beside the commutator 16 is a pair of collector-rings, (indicated at 18.) The brushes bearing upon these collector-rings are also conventionally indicated by dotted lines 19. These collector-rings are electrically connected to the terminals of the exciting-winding of the revolving-field magnet structure 5 of the main alternator and serve to convey the exciting-current thereto.

Mounted upon an outboard end of the shaft 10 are three more collector-rings. (Indicated in Fig. 1 at 20.) These collector-rings are connected in three-phase relation with the armature-winding of the exciter-armature 4 and serve to convey thereto alternating current derived from the induced member 2 of the main alternator.

The main terminals of the alternator are indicated at 21. From these terminals connections are made leading to the primary windings of a set of series transformers, through which the current from the alternator is conveyed to suitable consumption-circuits. The secondaries of these series transformers are connected to terminals 22, shown in Fig. 2 as projecting from an opposite side of the machine from the main terminals, the terminals extending within the frame and emerging therefrom at 23, where they make connection with suitable brushes (not shown) bearing upon the collector-rings 20. The connections thus roughly described will be better understood by reference to the diagram Fig. 3. For convenience this diagram represents the circuits of a compensated alternator of four poles, although in Figs. 1 and 2 it will be seen the machine has eight poles. The principle of operation, however, is the same, regardless of the number of poles.

Referring more in detail to the diagram, it will be seen that the compensated alternator consists of two machines, the main alternator at 24 and the exciter 25. The main alternator consists of a four-pole revolving field 35, excited by direct current conveyed over the lines 26, this revolving field being located in inductive relation to a fixed induced member 27, provided with any suitable winding—as, for example, a distributed three-phase winding connected to terminals 28. From these terminals mains lead to the primaries 29 of a set of series transformers, after traversing which primaries they extend to suitable consumption-circuits. The secondaries 30 of the series transformers are connected together—as, for example, by a Y connection—and then to collector-rings 31, by which the current from the secondaries is conveyed to the armature 32 of the exciter 25, into the winding of which the current passes by means of connections in three-phase relation so interrelated as to produce a field rotating about the armature in a direction opposite the direction of rotation of the armature itself. The armature 32 of the exciter being caused to rotate synchronously with the revolving-field magnet 35 by some suitable means—as, for example, by being mounted on a common shaft (indicated conventionally by dotted lines 33)—the rotating field set up in the armature-winding of the exciter assumes a position in space which is stationary except for a varied shifting angular displacement back or forth, depending upon the amount of lag or lead of the alternating current sent into the winding through the collector-rings 31 in the manner already described. This armature reaction due to the alternating current operates to strengthen or weaken the field of the exciter, thereby producing corresponding regulation of the main alternator 24 in a manner set forth at length in the above-mentioned patent.

Having thus described my invention, what I claim as new, and desire to secure by Letters Patent of the United States, is—

1. The combination of an internal revolving-field alternator, an exciter or regulating-machine therefor having its armature synchronously rotatable with the revolving-field member of the alternator, collector-rings connected to said armature, and other collector-rings connected with said revolving-field member.

2. The combination of an internal revolving-field alternator, an exciter or regulating-machine therefor having its armature mounted on the same shaft as the revolving-field member of the alternator, and means for angularly adjusting the field of the exciter.

3. A dynamo-electric machine consisting of a main machine and an exciter therefor with the revolving members of each mounted on the same shaft, and means for moving the field of the exciter relatively to the fixed member of the main machine.

4. The combination of a main machine, a synchronously-driven exciter therefor, and means for adjusting the exciter-field relatively to the fixed member of the main machine.

5. The combination of a main machine, an exciter therefor having a field-magnet structure provided with pole-pieces, bridges of magnetic material extending between said pole-pieces, and means for adjusting the exciter-field relatively to the fixed member of the main machine.

6. A compensated alternator consisting of a main machine of the revolving-field type, an exciter or regulating-machine therefor having its armature and commutator mounted on the same shaft as the revolving member of the main machine, collector-rings connected to points in the winding of said armature, and other collector-rings connected to the winding of the revolving field of the main machine.

7. A compensated alternator consisting of a main machine of the revolving-field type, an exciter or regulating-machine therefor having its armature and commutator mounted on the same shaft as the revolving member of the main machine, collector-rings connected to points in the winding of said armature, other collector-rings connected to the winding of the revolving field of the main machine, and a rigid supporting structure or frame for carrying the fixed members of both machines.

8. A compensated alternator comprising a main machine, an exciter therefor, a single shaft upon which the revolving member of the main machine and armature of the exciter are both mounted, and means for shifting the field structure of the exciter relatively to the fixed portion of the main machine.

In witness whereof I have hereunto set my hand this 12th day of November, 1900.

HENRY G. REIST.

Witnesses:
BENJAMIN B. HULL,
MABEL H. EMERSON.